Jan. 5, 1960

S. BECKWITH 2,920,218

SUPERCHARGED DYNAMOELECTRIC MACHINE WITH
COOLING GAS IN CONTACT WITH CONDUCTORS

Filed Aug. 23, 1951

Inventor
Sterling Beckwith
by T. Lloyd La Faue
Attorney

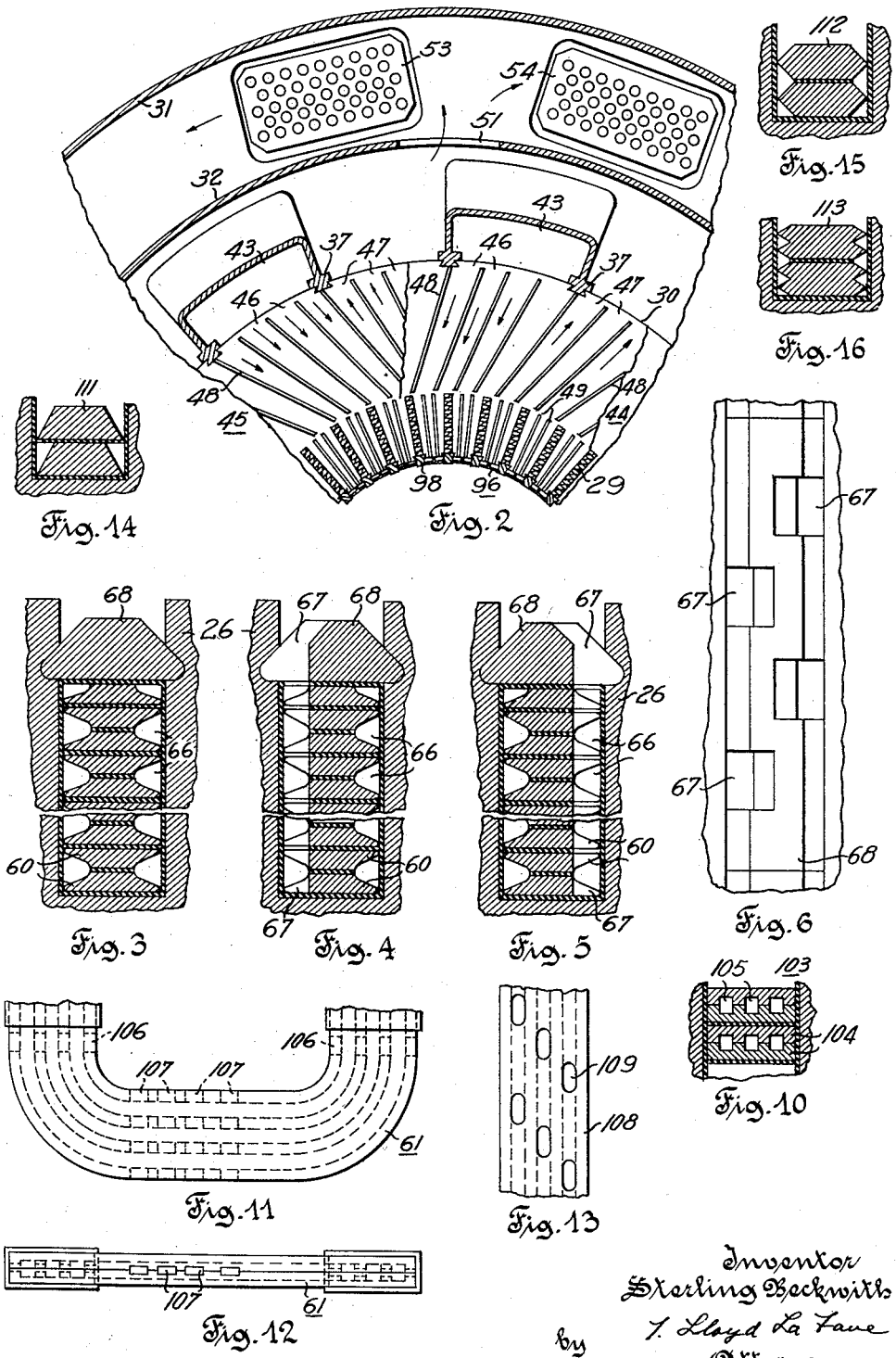

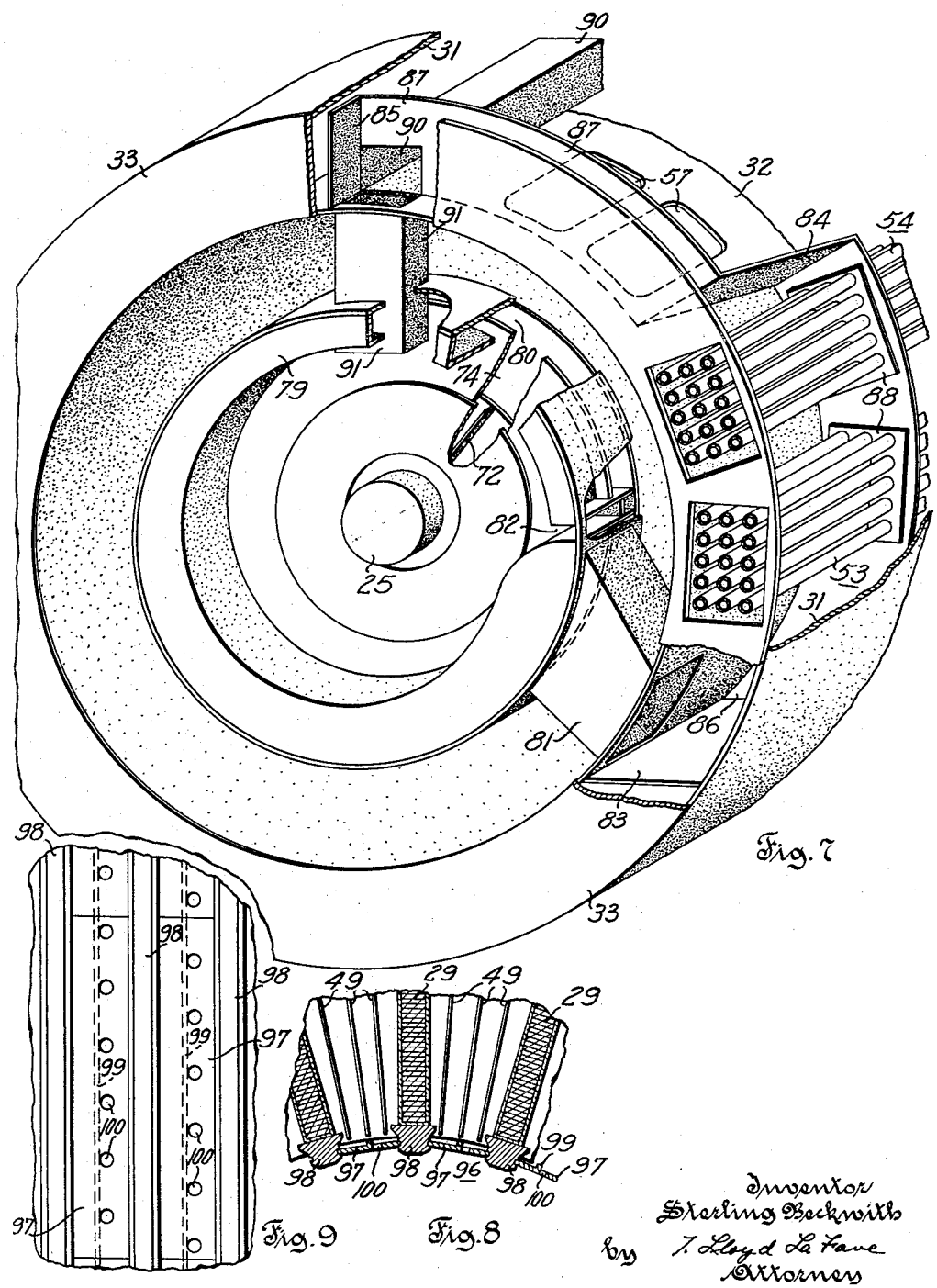

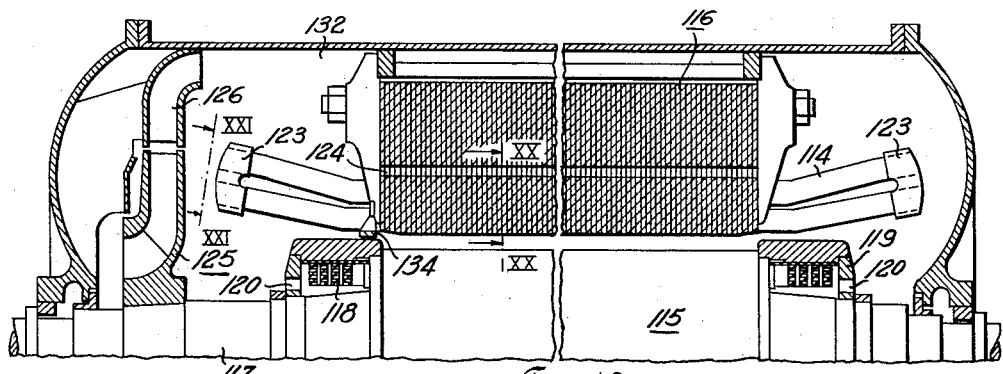
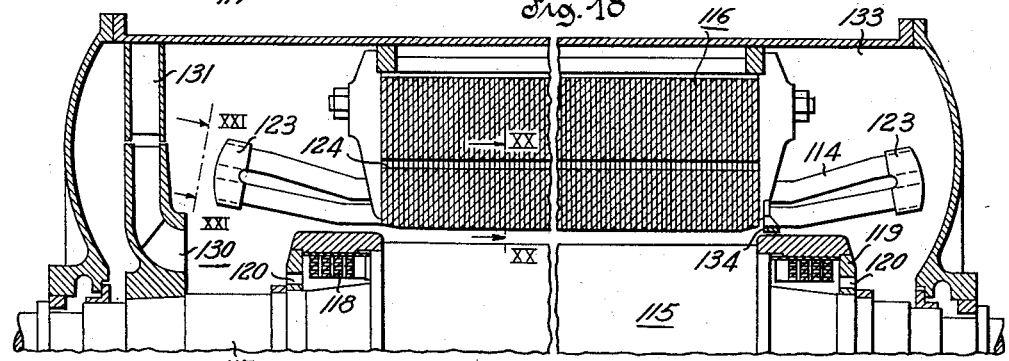
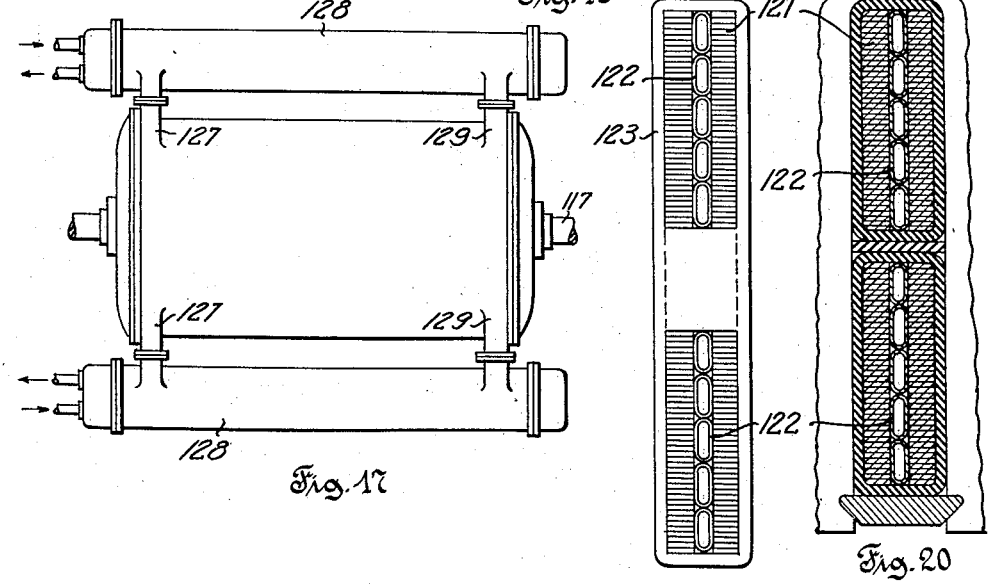

United States Patent Office 2,920,218
Patented Jan. 5, 1960

2,920,218

SUPERCHARGED DYNAMOELECTRIC MACHINE WITH COOLING GAS IN CONTACT WITH CONDUCTORS

Sterling Beckwith, Wauwatosa, Wis., assignor to Allis-Chalmers Manufacturing Company, Milwaukee, Wis.

Application August 23, 1951, Serial No. 243,255

23 Claims. (Cl. 310—55)

This invention relates to the construction and ventilation of dynamoelectric machines, particularly to improved ventilating arrangements for large high speed machines such as turbogenerators which are preferably hydrogen cooled.

The maximum power rating of a dynamoelectric machine such as a hydrogen cooled turbogenerator is limited by the cooling thereof, particularly of the rotor of such a machine. The present invention employs new and improved ventilating arrangements to increase the cooling of the machine so that either the power rating of the machine may be increased, or for a given rating the size of the machine may be substantially reduced.

Heretofore, hydrogen cooled dynamoelectric machines such as turbogenerators had fans which, when operated in hydrogen of normal purity, developed maximum differential pressures of the order of two and one-half inches of water and circulated hydrogen through the machine at rates above about eighty cubic feet per minute per kilowatt absorbed by the hydrogen to keep the temperature rise of the conductors below a certain maximum.

According to the present invention a gas cooled dynamoelectric machine such as a hydrogen cooled turbogenerator is cooled by a new and improved ventilating arrangement in which hydrogen is brought into direct contact with the conductors which are disposed in slots in the core. The axial ducts which bring the hydrogen in direct contact with the conductors are necessarily of small transverse cross sectional area and of great length. These ducts therefore have considerable resistance to the flow of ventilating gas. Fans heretofore used to circulate hydrogen in dynamoelectric machines could not force sufficient hydrogen through such axial ducts to keep the temperature rise of the hydrogen below an essential maximum, and the rating of the turbogenerator having such ducts therefore could not be increased by the use of such fans.

This maximum below which it is essential that the temperature rise of the gas in the axial ducts be kept is the American Institute of Electrical Engineers' standard hot spot maximum of ninety-five degrees centigrade rise less the temperature difference between the copper and the cooling gas. The maximum gas rise would thus be seventy-five degrees centigrade if the gas to copper drop were twenty degrees centigrade. The gas requirements would then be twenty-five cubic feet per minute per kilowatt of heat absorbed by the gas, which is the amount of either hydrogen or air to give seventy-five degrees centigrade gas rise when the absolute pressure is one atmosphere.

As soon as the gas flow reaches about twenty-five cubic feet per minute per kilowatt of heat produced in the rotor conductors, a threshold is passed and permissible rotor heat production can be increased roughly in proportion to the gas flow. For a gas flow below the threshold value, however, the gas temperature rise, at a point where gas discharges from the rotor, would be so high that acceptable hot spot temperatures would be exceeded.

In order to obtain the necessary flow of ventilating gas through a dynamoelectric machine, such as the hydrogen cooled turbogenerator embodying the present invention, very high differential gas pressures are necessary. With air as the ventilating gas, the differential pressure necessary is at least eight times that normally developed heretofore. With hydrogen as the ventilating gas the differential pressure necessary is increased from the previous normally developed maximum differential pressure of two and one-half inches of water to a differential pressure of at least eight inches of water. Thus, the capacity of this machine can be increased by operating above the threshold value of twenty-five cubic feet per minute of ventilating gas passing through the machine instead of the previous normal minimum value of eighty cubic feet per minute of ventilating gas.

It is therefore an object of the invention to provide an improved cooling arrangement for the conductors of a dynamoelectric machine with the ventilating gas in direct contact with the conductors.

Another object of the invention is to provide improved cooling means for the conductors of a dynamoelectric machine which shall be easily constructed and economically manufactured.

Another object of the invention is to increase the output capacity of a turbogenerator with given physical dimensions particularly to permit building of larger generators than would otherwise be possible.

Another object of the invention is to decrease the physical dimensions and weight of a turbogenerator with a given output capacity.

Another object of the invention is to provide an improved ventilating arrangement for a dynamoelectric machine which substantially eliminates differential expansion between a core conductor and the core iron.

Another object of the invention is to provide an improved totally enclosed gas cooled dynamoelectric machine whose power rating may be proportionally increased by more than the proportionate increase in the average gas pressure within the machine housing.

Other objects and advantages will be apparent to one skilled in the art from the following description taken with the accompanying drawings, in which the different figures are drawn on different scales. In the drawing:

Fig. 2 is a cross sectional view, rotated by substantially ninety degrees, of a portion of the dynamoelectric machine taken along line II—II of Fig. 1 with a portion of a group of stator laminations broken away to show adjacent stator radial ventilating passages;

Figs. 3, 4 and 5 are cross sectional views of conductors secured by slot wedges in a slotted rotor core of the dynamoelectric machine taken along lines III—III, IV—IV and V—V, respectively of Fig. 1;

Fig. 6 is a plan view of a rotor slot wedge employed in the central portion of the rotor of the dynamoelectric machine of Fig. 1;

Fig. 7 is an isometric view of a portion of the machine of Fig. 1 to schematically illustrate a portion of its ventilating arrangement;

Fig. 8 is a view of a portion of the stator core shown in Fig. 2 to show an air gap shield;

Fig. 9 is a plan view of a portion of the air gap shield shown in Figs. 2 and 8;

Fig. 10 is a view in transverse cross section of a portion of an alternate form of core winding lying in a rotor slot and comprising conductors each having a plurality of longitudinal ventilating ducts;

Fig. 11 is a plan view of an end turn portion of the winding of Fig. 10;

Fig. 12 is an end view of the end turn portion of a conductor of the rotor winding shown in Fig. 11;

Fig. 13 is a plan view of a portion of an apertured slot wedge employed with rotor conductors shown in Fig. 10;

Figs. 14, 15 and 16 are views in transverse cross section of portions of other forms of slot windings;

Fig. 17 is a plan view of another gas cooled dynamoelectric machine embodying the present invention;

Fig. 18 is a view in sectional elevation of a portion of the machine of Fig. 17;

Fig. 19 is a view in sectional elevation of a portion of the machine of Fig. 17 showing a modified blower arrangement;

Fig. 20 is a view in transverse cross section of a slot portion of the stator winding of the dynamoelectric machine of Fig. 18 taken along the lines XX—XX; and Fig. 21 is an end view of an end turn of the stator winding of the dynamoelectric machine of Fig. 18.

Figure 1:
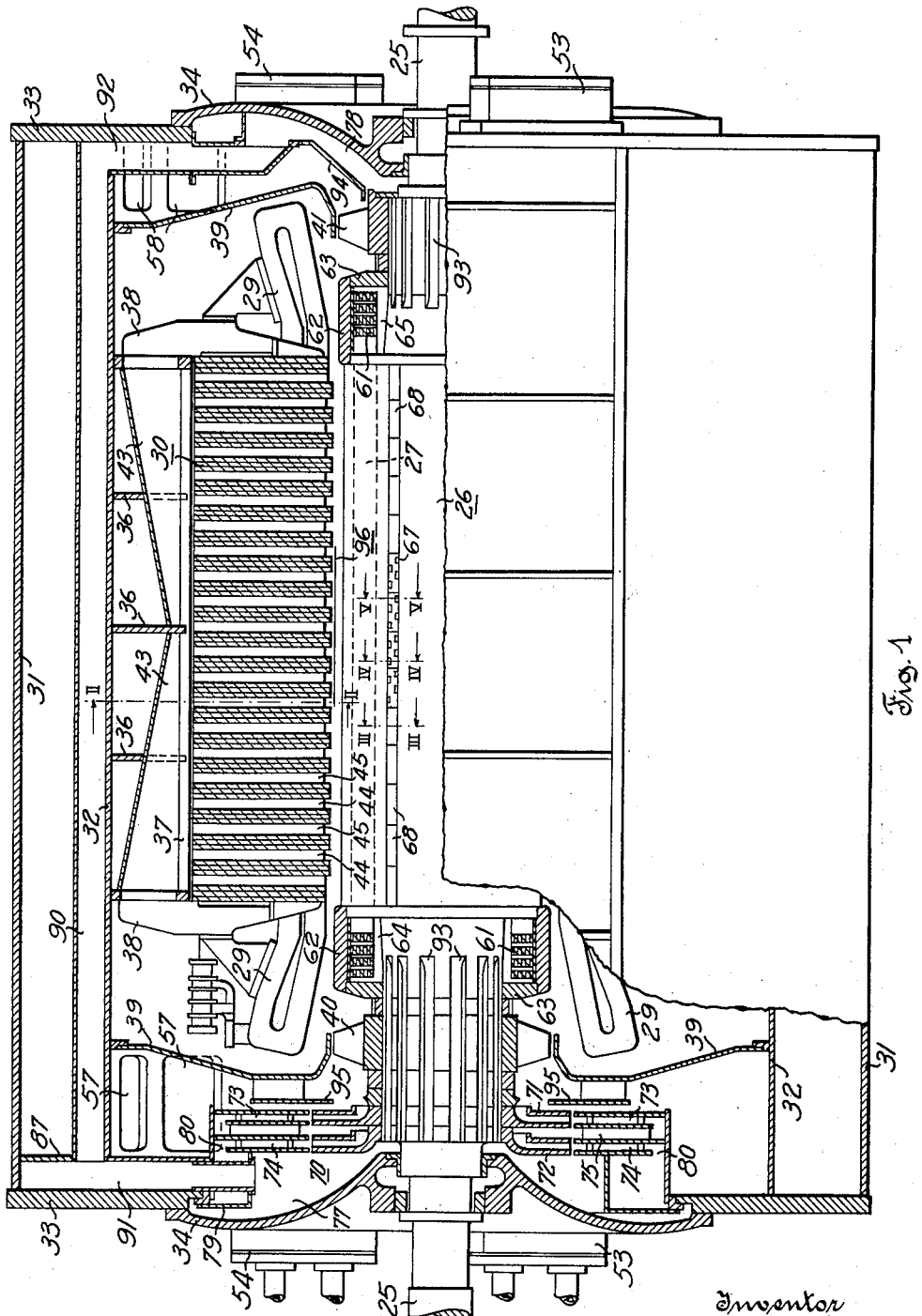
Fig. 1 is a view partly in elevation and partly in longitudinal cross section of a dynamoelectric machine embodying the present invention.

Referring to the drawing, the totally enclosed dynamoelectric machine such as the turbogenerator shown in Fig. 1 comprises a rotating field member or rotor mounted on or integral with a rotatable shaft 25 supported in suitable bearings, not shown. The rotor comprises a slotted magnetic core 26 provided with a field winding. The bearings support the rotor core 26 in coaxial relation with a stator with an air gap therebetween.

The stator is of conventional form and comprises an armature winding 29 supported in a slotted laminated magnetic core 30 mounted in a stationary support.

The stationary support comprises a cylindrical shell 31 which supports the stator core 30 through a cylindrical frame 32 spaced from the shell. Radially rigid annular end plates 33 secure the ends of the frame and shell. Removable end bells 34 are secured to the end rings and their central portions are provided with suitable shaft seals. The end bells, and rings, and shell are assembled to form a totally enclosed housing for the machine. The housing is normally fillable with ventilating gas such as hydrogen or other light density gases but under emergency conditions air may be used as the ventilating gas. The gas may have an average pressure equal to atmospheric pressure, but may have an average pressure of any suitable value, such as thirty pounds per square inch above atmosphere. Frame 32 comprises apertured radial support plates 36 secured to the radially inner surface of the frame to support longitudinally extending bars 37 on which the stator laminations are assembled. Clamping members 38 hold the laminations in position.

Secured to the end portions of the frame between the end bells and the stator core are shields 39 of dished cross section extending inwardly toward the rotor shaft with their central portions extending axially inward to form housings for fans 40, 41 on the rotor shaft.

The frame includes longitudinal supply ducts 43 inserted in apertures in the radial plates 36 and held in position thereby with the inner edges of the ducts secured to the longitudinal bars 37. The ducts 43 are open at their ends to connect with the spaces between the shields 39 and the stator core through indentations of members 38. The ducts are also open on their radially inner side to connect with radial stator core ventilating passages 44, 45 of Fig. 1 as shown in Fig. 2.

The stator core laminations are arranged in groups providing the radial ventilating passages 44, 45 between groups. Each passage extends from the outer periphery of the core 30 to the air gap and is subdivided into inlet passages 46 and discharge passages 47 by spacer elements 48, 49 secured to an adjacent lamination. Inlet passages 46 connect the ducts 43 with the air gap, and discharge passages 47 connect the air gap with the space between adjacent ducts and the frame 32. The spacer elements 48 in alternate ventilating passages 44 are inclined in one direction with respect to a radial line, and the spacer elements in the remaining alternate ventilating passages 45 are oppositely inclined. This effects a spiral arrangement of the spacer elements with the spiral reversed in adjacent radial ventilating passages 44, 45 to assure uniform cooling around the periphery of the stator core.

Ventilating gas from the discharge passages 47 moves circumferentially of the stator core between the stator core 30, the ducts 43 and the frame 32 and passes through longitudinal rows of apertures 51, shown in Fig. 2, in the frame to the space between the frame and the shell 31.

Heat in the circulated ventilating gas is absorbed by cooling units 53, 54 of generally conventional type disposed longitudinally in the space between the shell and the frame in the path of the circumferential travel of the ventilating gas. Four coolers may be used with pairs of coolers 53, 54 disposed on opposite sides of the machine, with a row of apertures 51 in the cylindrical frame opening to the space between coolers 53, 54 of each pair. Each cooler unit comprises a plurality of longitudinally extending tubes secured at the ends of the unit in a header secured to the end rings in a conventional manner to prevent leakage of gas from the machine.

Cooling of the stator core during operation of the machine is effected by the fans 40, 41 mounted on the rotor shaft at opposite ends of the rotor core. Each fan 40, 41 blows ventilating gas over the end turns of the stator winding 29, thence into longitudinal ducts 43 to the periphery of the stator core, thence radially inward through inlet passages 46 to the air gap, thence either circumferentially or axially to discharge passages 47, thence radially outward through these discharge passages 47 and radially through frame apertures 51 to the space between the shell and frame and between a pair of coolers 53, 54. Ventilating gas between the coolers divides and flows circumferentially in opposite directions through adjacent coolers 53, 54, then the ventilating gas again divides to flow axially to both ends of the housing, and then radially inward through ports 57, 58 in the frame to the spaces confined between the end bells and the shields 39 back to the fans 40, 41 for recirculation through the machine.

To increase the effectiveness of rotor ventilation the rotor windings 27 are constructed and arranged in the slots of the rotor core 26 to provide axial ventilating ducts bringing the ventilating gas passing therethrough into direct contact with the metal of the winding conductors. The conductors 60 of the axially extending rotor windings 27 have their end turns 61 held in place at each end by a retaining ring 62 and an end plate 63 which together with the shaft and the end of the core define enclosed spaces 64, 65 confining the end turns 61. As more fully explained below supercharged ventilating gas is supplied to enclosed spaces 64, 65.

The arrangement of the conductors 60 within the rotor slots is clearly shown in Figs. 3 to 5. The conductors are disposed in superposed insulated relation within the straight walled slots. Each conductor has a substantially trapezoidal cross section. The adjacent conductors in each slot are reversed so that adjacent conductors of a pair cooperate with the insulated walls of the slot to define therebetween smooth surfaced axial ventilating ducts 66 on opposite sides of the slot extending the length of the rotor core. These ducts are open at the ends of the slots to the enclosed spaces 64, 65

Radial ventilating passages 67 connect the axial ventilating ducts 66 with the air gap of the machine. The radial passages are located intermediate the ends of the slot portions of the rotor conductors and may be spaced throughout the length of the core or concentrated at the central portion thereof as shown in Fig. 1. The radial passages 67 extend through the side portions of the conductors and the side portions of slot wedges 68 and these passages are staggered on opposite sides of the slots.

The supercharged ventilating gas may be supplied to the rotor by a high pressure device such as the large diameter two stage centrifugal blower 70 shown mounted on the shaft at one end of the machine between an end bells 34 and fan 40. The blower 70 comprises first and second stage impellers 71, 72, respectively, and radially aligned therewith cooperating stationary annular diffusers 73, 74 with a return passage 75 from the first diffuser to the inlet of the second impeller. The inlet to the first impeller 71 is located centrally thereof along the shaft and adjacent fan 40. Ventilating gas from the blower leaves the second diffuser and is directed by suitable means to pressure chambers 77, 78 at opposite ends of the machine.

Such means may comprise, as shown in Fig. 7, a spiral or volute box 79 of graduated cross section which is open on one side to receive ventilating gas discharged through the annular port 80 from the second diffuser 74. The narrowest and widest portions of volute box 79 are closed by plates separated by a gap 82. A radial plate extends across gap 82 to the radially outer wall of the box to close the portion of annular port 80 bridging the gap. The volute box is connected at its widest portion to a radial extension 81 which opens to an end space between the frame and the shell. This end space is enclosed by shell 31, frame 32, annular end plate 33, longitudinal plates 83, 84, 85, and by annular plate segments 86, 87. Plate segment 86 has apertures through which the coolers 53, 54 extend. Each cooler unit is provided with a tube steady plate 88 which abuts the plate segment 86 to prevent axial flow of ventilating gas between the enclosed end portions and the main portions of the coolers. This end space is connected to a channel 90 which is longitudinally disposed between shell and frame and extends the length of the machine between the rigid end rings. At the blower end of the housing a chimney 91 is connected to the channel 90 and leads radially inward, projecting through the volute box 79 to pressure chamber 77 enclosed by an end bell and the blower 70. A pressure chamber 78 is similarly located at the other end of the machine and formed between a shield 94 and an end bell 34. A chimney 92 connects the adjacent end of the channel 90 to pressure chamber 78.

Duct means for connecting the axial ventilating ducts 66 in the rotor to the pressure chambers 77, 78 may comprise axial ducts in the shaft formed by flutes 93 in the shaft at both ends of the machine. At one end of the shaft the mounting for the blower 70 and fan 40 encloses flutes 93 so the ducts formed thereby open only into pressure chamber 77 and into space 64 enclosing rotor end turns. At the other end of the shaft, the mounting for fan 41 encloses flutes 93 so the ducts formed thereby open only into pressure chamber 78 and into space 65 enclosing rotor end turns.

In the operation of the turbogenerator the supercharger or blower 70 draws ventilating gas from the coolers through ports 57 through which ventilating gas is also drawn by fan 40. An annular baffle plate 95 may be secured to adjacent shield 39 and radially positioned in the space between the blower and shield to prevent suction created by the blower interfering with the flow of ventilating gas to fan 40 and to permit ventilating gas to flow axially in opposite directions through fan 40 and blower 70. Ventilating gas enters the inlet to the first impeller 71 which forces it into diffuser 73. From diffuser 73 ventilating gas returns by passage 75 to the inlet to the second impeller 72 which forces it into diffuser 74. From diffuser 74 the ventilating gas flows through annular port 80 into spiral box 79 which is open to port 80, thence through box 79, and radial extension 81 into the end space enclosing the end portions of a pair of coolers 53, 54, thence circumferentially along said circumferential plates 86, 87 through both these coolers which remove a substantial portion of the heat in the ventilating gas, which may be the amount of heat added by the compression of the ventilating gas in the blower. From the end portions of the coolers the ventilating gas then flows toward the inlets to channels 90 and chimney 91 where the ventilating gas divides into two portions. One portion of the ventilating gas flows radially inward through chimney 91 to pressure chamber 77 at one end of the machine. The other portion of ventilating gas flows longitudinally of the machine through channel 90 and thence through chimney 92 radially inward to pressure chamber 78 at the other end of the machine. The ventilating gas in pressure chambers 77, 78 is at a relatively high pressure with respect to the pressure of the ventilating gas supplied to the stator by fans 40, 41. The blower 70 for cooling the rotor conductors 60 develops five times the normal pressure produced by fans 40, 41 for cooling the stator core. With hydrogen as the ventilating gas the blower 70 develops a differential pressure of substantially fifteen inches of water. With air as the ventilating gas, the blower 70 actually compresses the gas significantly, developing over one and one-third atmospheres absolute pressure or a differential pressure of over one-third atmosphere.

Under such relatively high pressure the ventilating gas flows from the pressure chambers axially through the shaft flutes 93 into the enclosed spaces 64, 65 where the rotor end turns are exposed, thence into the end supply points of axial ducts 66 adjacent the rotor conductors where the gas flows at very high velocities longitudinally of the conductors and in direct contact therewith, thence radially through the rotor radial ventilating passages 67 and to the discharge points thereof into the air gap of the machine. The ventilating gas discharged from the rotor flows radially through the discharge passages 44, 45 which extend radially through the stator core. Fans 40, 41 may cooperate with the blower in forcing rotor ventilating gas through discharge passages 44, 45 in the stator core along with the stator ventilating gas. The rate of flow of the ventilating gas through the rotor is at least twenty-five cubic feet per minute per kilowatt of heat to be removed and the temperature rise of the ventilating gas does not exceed seventy-five degrees centigrade. When hydrogen is the ventilating gas used, the blower 70 must supply the hydrogen at a differential pressure of at least eight inches of water between the supply and discharge points of the rotor ducts. The actual pressures developed by the blower 70, however, increases the rate of gas flow and permits proportionate increase in the rotor kilowatts to be absorbed.

Hot ventilating gas discharged from the rotor may cause heating of stator coils and may oppose the flow of ventilating gas through stator inlet passages 46 to the air gap. In order that rotor ventilating gas will not cause any appreciable heating of the stator coils and will not oppose radially inward flow of stator ventilating gas, especially when rotor ventilating gas is discharged over a concentrated portion of the rotor, a coaxial shield 96 may be secured in spaced relation to the inner periphery of the stator core 30, as shown in Figs. 2, 8 and 9. This shield extends beyond the rotor discharge area as shown in Fig. 1. The coaxial shield 96 comprises bridges 97 which may be made of any suitable material such as laminated synthetic resin. Bridges 97 are supported by adjacent stator slot wedges 98 which are suitably shaped for this purpose. Each bridge 97 has a longitudinal rib 99 centrally thereof which abuts one of the stator teeth. Along the shield portion of the stator core, the stator ventilating gas flows in inlet passages 46 to the air gap, thence it flows only axially in the spaces between the bridges 97 and stator teeth to an adjacent discharge passage 47. The bridges are provided with openings such as drilled holes 100 which align only with the stator discharge ventilating passages 47. The holes 100 are positioned adjacent rib 99 along the leading side thereof with respect to the rotation of the rotor so that the hot ventilating gases discharged from the rotor do not impinge on the coil sides but impinge on the rib 99 and are directed through the discharge passages 47 between pairs of spacer elements 48, 49 removed from the coil sides. Thus there is very little mixing of the hot rotor gases with cooling stator gases in the stator core.

After being discharged from the stator core the ventilating gases from fans 40, 41 and from blower 70 mix together as such gases flow circumferentially of the core, thence, radially through frame aperture 51 between a pair of coolers 53, 54 thence circumferentially in opposite directions through the main portions of these coolers and thence through return ports 57, 58 back to blower 70 and to fans 40, 41 for recirculation through the machine.

The rotor of the turbogenerator may comprise a core provided with slots and axially extending conductors lying in stacks of superposed layers inserted over part of their length in the slots as illustrated in Figs. 10 to 13. Each of theses conductors 103 is fabricated of a pair of superposed copper straps 104 having mutually abutting surfaces. Each strap has a plurality of longitudinal grooves in the abutting surface thereof formed in any suitable manner such as by milling so that the grooves in the straps of each conductor cooperate together to define a plurality of axial ducts 105, whereby each conductor offers a greatly increased surface area in contact with ventilating gas by comparison with a single duct of equivalent cross sectional area. The end turn portions of the conductors 103 have transverse aligned grooves in the abutting surface of the straps of each conductor to form transverse ducts 106, 107 therethrough which connect the longitudinal ducts with the outside surfaces of each stack in the enclosed spaces 64, 65 under the retaining rings 62, for the admission of rotor ventilating gas axially through the slot portions of the rotor conductors. Ventilating gas enters the conductors through transverse ducts 107 in the loop portion of the end turn, and additional ventilating gas is added thereto through transverse ducts 106 located in the conductors where they enter the rotor core. Suitable radial ventilating openings are provided in the stack of rotor conductors intermediate the ends of the rotor core. The radial ventilating openings 109 extend through a slot closing wedge 108, are longitudinally spaced and connect with the axial ducts in the rotor conductors.

Figs. 14 to 16 illustrate other forms of slot conductors which may be employed to make up a winding which provides axial ducts in which the ventilating gas has direct contact with the conductors. These conductors 111, 112 and 113 have axial ducts defined between the conductors and the straight sided walls of the core slot which are therefore open to ventilating gas in their end turn portions. Conductors 111 are of trapezoidal cross section. Conductors 112 have V-shaped sides abutting the walls of the slot so that adjacent conductors and a wall of the slot define an axial duct therebetween. Conductors 113 are formed with two V-shaped projections along opposite sides which define a V-shaped groove therebetween. Each conductor 113 has a V-groove which defines an axial duct with a wall of the slot, and adjacent conductors 113 with a wall of the slot define another duct therebetween to provide a multiplied conductor surface area in contact with the ventilating gas.

The method of cooling the rotor of a dynamoelectric machine using a supercharger for the rotor ventilating gas may also be applied to both the rotor and stator. The totally enclosed gas cooled turbogenerator illustrated in Figs. 17 and 18 has such supercharged ventilating gas supplied to both its rotor 115 and stator 116. The rotor may be integral with or mounted on a rotatable shaft 117 and the rotor includes axially extending windings 118 in a slotted core. The windings 118 may comprise suitable conductors constructed and arranged to provide for the passage of ventilating gas axially through the rotor core and in direct contact with the copper of the conductors. Such a winding may comprise the conductors shown in Figs. 3, 10 or 14 to 16 but preferably those shown in Fig. 3. The rotor conductors extend outwardly from the core to end turns held in place by a retaining ring and an end plate 119. The end plate is provided with apertures 120 to permit the entrance of ventilating gas which enters the axial ventilating ducts which are open in the end turn portions of the conductors. Radial ventilating ducts preferably are not provided in the conductors and in the rotor slot wedges. The ventilating gas flowing along the conductors from one end of the core to the other.

The stator 116 comprises a slotted laminated core provided with an axially extending winding 114 which may comprise any suitable ventilated conductors, as described herein, but preferably comprises the stranded conductors shown in Figs. 20, 21. These conductors comprise strands 121 stacked on opposite sides of the slot and spaced by a plurality of high resistance metal tubes 122 which extend longitudinally of the conductor. These high resistance tubes 122 are preferably of Monel metal, which has an ohmic resistance thirty-eight times that of copper, so that the depth of the tubes may be made more than the depth of several conductor strands without producing undue eddy current losses in the tubes. The end connection joining two conductors extending in different slots comprises a clip 123 which envelops the spaced end portions of the two conductors and is brazed along its sides to the strands of the conductors. The ends of the tubes 122 extend as in a window of the clip 123 so that ventilating gas can enter the tube openings and pass through the tubes in good heat conducting relation to the strands of the conductors from one end of the machine to the other.

The stator core may also be provided with axial ventilating ducts through the laminated core comprising aligned holes in the laminations forming ducts 124 which open to the ends of the core between clamping fingers and adjacent to core slots containing stator windings. These ducts will pass a limited proportion of the stator ventilating gas between the ends of the machine.

To restrict the flow of ventilating gas through the air gap, annular members 134 which may be made of any suitable material such as laminated synthetic resin are suitably mounted on the stator core with the inner periphery of each annular member close to the surface of the adjacent rotor retaining ring.

The supercharger comprises a single stage blower 125 mounted on the shaft at one end of the machine. The blower draws ventilating gas through ducts 127 in the machine housing connecting with coolers 128 mounted longitudinally of the machine on opposite sides thereof. The blower has a diffuser passage 126 which directs compressed ventilating gas into a compression chamber 132 comprising the space adjacent the near ends of the stator and rotor. From this space the ventilating gas enters the axial ducts in the stator and rotor windings, as well as the air gap and axial ducts in the stator core, then flows at high velocity through these ducts to the other end of the machine where ducts 129 return the ventilating gas through the coolers back to the blower.

The sizes of stator ducts 124 and of the ducts formed by tubes 122 are relatively proportioned so that the relative amounts of ventilating gas passed therethrough substantially eliminates differential expansion between the conductors and the iron of the stator core when the machine is operated near rated load.

Because of the high differential pressure produced by the blower 130 the axial ducts 124 extending through the core laminations permit effective cooling of the core iron without the use of radial passages, even on the longest machines, and thus permits use of substantially more core iron in a given core length.

Fig. 19 shows a turbogenerator like that of Fig. 18 but comprising a blower 130 which draws the ventilating gas from the stator and rotor axial ventilating ducts. The blower 130 forces the ventilating gas through its diffuser passage 131 directly into the coolers 128 through ducts 127. In this arrangement the ventilating gas is forced through the coolers 128, which remove heat from the ventilating gas including heat generated therein by the action of the blower. The gas is delivered from the coolers into a compression chamber 133 at the machine end remote from blower 130 and then drawn through the stator and rotor cores back to the blower 130.

The supercharger may also be employed for cooling the stator as well as the rotor of a turbogenerator such as is shown in Fig. 1. Substituting the stator of Fig. 19 for the stator of Fig. 1, the high pressure blower forces ventilating gas through the axial stator ducts from the blower end of the machine to the other end. The blower also forces ventilating gas into both ends of the rotor, through the axial rotor ducts and radial passages of the air gap, thence axially through the air gap to the other end of the machine. The air gap is restricted in size at the blower end of the machine by annular member 134 which substantially prevents the axial flow of ventilating gas toward that end of the air gap.

While but a few embodiments of the present invention have been shown and described, further embodiments or combinations of those described herein will be apparent to one skilled in the art without departing from the spirit of the invention or the scope of the appended claims.

It is claimed and desired to secure by Letters Patent:

1. A gas cooled dynamoelectric machine enclosed in a gas tight housing, said machine comprising a stator having axially extending windings and radial ventilating passages, a cooler mounted longitudinally of said stator, a rotatable shaft, a rotor mounted on said shaft, said rotor comprising a slotted core provided with axial ducts and radial ventilating passages, fans mounted on said shaft adjacent both ends of said rotor forcing ventilating gas over the end turn portions of said stator windings, a blower mounted on said shaft between one said fan and an end of said housing for compressing said gas to a relatively high pressure, duct means connected to said blower for passing said compressed ventilating gas discharged from said blower circumferentially through an end portion of said cooler, means directing said compressed ventilating gas from said end portion of said cooler through said rotor through said rotor ducts and radial ventilating passages, thence through said stator radial ventilating passages and the remaining portion of said cooler, and thence back to said fans and to said blower.

2. A gas cooled dynamoelectric machine comprising a cooler, a stator, a rotatable shaft, and a rotor mounted on said shaft, said stator having radial inlet and discharge ventilating passages and axially extending windings, said rotor including a slotted core provided with axially extending windings, said rotor windings comprising conductors constructed and arranged in said core slots to provide longitudinal ducts bringing said gas in direct contact with said conductors, radial ventilating passage intermediate the ends of said rotor connecting said longitudinal ducts with the air gap of said machine, means enclosing the portions of said rotor windings extending beyond said core, a centrifugal blower mounted on said shaft, duct means for leading gas from said blower through said enclosing means to said longitudinal ducts of said rotor, said blower compressing said gas to a relatively high pressure to cause said gas to flow axially through said duct means and said longitudinal ducts in said rotor, thence radially through said radial passages in said rotor, said air gap and said discharge passages in said stator, thence through said cooler and thence back to said blower, and a fan mounted on said shaft adjacent said enclosing means for forcing ventilating gas in a path over the end turn portions of said stator windings, thence radially inward through said stator inlet passages to the air gap of said machine, thence radially outward through said stator discharge passages, said fan cooperating with said blower in forcing ventilating gas through said other discharge passages in said stator and through said cooler.

3. A gas cooled dynamoelectric machine comprising a cooler, a stator, a rotatable shaft, and a rotor mounted on said shaft, said stator having radial ventilating passages and axially extending windings, said rotor including a slotted core provided with axially extending windings, said rotor windings comprising conductors constructed and arranged in said core slots to provide longitudinal ducts bringing said gas in direct contact with said conductors, radial passages intermediate the ends of said rotor connecting said longitudinal ducts with the air gap of said machine, means enclosing the portions of said rotor windings extending beyond said core, a centrifugal blower mounted on said shaft, duct means for leading gas from said blower through said enclosing means to said longitudinal ducts of said rotor, said blower forcing said gas in a path including said duct means and said longitudinal ducts and radial passages in said rotor, said air gap, some of said radial passages in said stator, said cooler, and said blower, said blower and said fan both drawing ventilating gas directly from said cooler, a radially extending baffle mounted between said blower and said fan so that ventilating gas drawn in one direction into said blower is separated from ventilating gas drawn in an opposite direction into said fan, thence radially inward through other of said stator radial ventilating passage to the air gap of said machine, thence radially outward through said some of said stator radial ventilating passages, said fan cooperating with said blower in forcing ventilating gas through said cooler.

4. A gas cooled dynamoelectric machine comprising a cooler, a stator, a rotatable shaft, and a rotor mounted on said shaft, said stator having radial ventilating passages and axially extending windings, said rotor including a slotted core provided with axially extending windings, said rotor windings comprising conductors constructed and arranged in said core slots to provide longitudinal ducts bringing said gas in direct contact with said conductors, radial passages intermediate the ends of said rotor connecting said longitudinal ducts with the air gap of said machine, means enclosing the portions of said rotor windings extending beyond said core, a centrifugal blower mounted on said shaft, duct means for leading gas from said blower through said enclosing means to both ends of said rotor to said longitudinal ducts of said rotor, said blower forcing said gas first through said rotor in a path including said longitudinal ducts and radial passages in said rotor, thence through said air gap and through some of said radial passages in said stator, thence through said cooler and back to said blower, fans mounted on said shaft adjacent said enclosing means at opposite ends of said core for forcing ventilating gas in a path over the axially extending portions of said stator windings, thence radially inward through other of said stator radial ventilating passages to the air gap of said machine, thence radially outward through said some of said stator radial ventilating passages, said fans cooperating with said blower in forcing ventilating gas through said cooler.

5. A totally enclosed dynamoelectric machine comprising a stator having axially extending windings and radial ventilating passages, a rotatable shaft, a rotor mounted on said shaft, a gas tight housing enclosing said stator and said rotor, fans mounted on said shaft adjacent the ends of said rotor, longitudinal ducts in said housing about said stator connected with said stator radial ventilating passages, a cooler disposed between said housing and said stator, said fans drawing ventilating gas from said cooler to supply ventilating gas to both ends of said stator and forcing said ventilating gas to circulate in a path over the end turns of said stator windings, thence into said longitudinal ducts, thence radially inward through some of said stator radial ventilating passages to the air gap of said machine and thence radially outward through others of said stator radial ventilating passages, thence from said stator through said cooler and back to said fans for recirculation through said machine; a blower mounted on said shaft at one end of said housing adjacent one of said fans, a gas compression chamber at each end of said housing, said rotor having axial ventilating ducts and radial ventilating passages, means connecting said rotor ducts with said compression chambers, and means comprising a channel connecting both said compression chambers with said blower, said blower forcing ventilating gas to flow through said channel to both ends of said housing to said compression chambers, thence axially in said rotor ducts and radially outward through said rotor radial ventilating passages to the air gap of the machine, the gas forced by said blower mixing with the gas forced by said fans through said other of said stator radial ventilating passages, thence through said cooler and back to said fans and said blower.

6. A totally enclosed dynamoelectric machine comprising a stator having axially extending windings and radial ventilating passages, a rotatable shaft, a rotor mounted on said shaft, a gas tight housing enclosing said stator and said rotor, fans mounted on said shaft adjacent the ends of said rotor, longitudinal ducts in said housing about said stator connected with said stator radial ventilating passages, a cooler disposed between said housing and said stator, said fans supplying ventilating gas to both ends of said stator and forcing said ventilating gas to circulate in a path over the end turns of said stator windings, into said longitudinal ducts, thence radially inward through some of said stator radial ventilating passages to the air gap of said machine and thence radially outward through other of said stator radial ventilating passages, thence through said cooler and back to said fans for recirculation through said machine; a blower mounted on said shaft at one end of said housing with ventilating gas admitted to said blower from the side adjacent said one of said fans, a gas compression chamber at each end of said housing, said rotor comprising a slotted core having axially extending windings constructed and arranged to provide axial ventilating ducts and radial ventilating passages to bring the ventilating gas in direct contact with said windings, duct means connecting said rotor ducts with said compression chambers, and means comprising a channel connecting both said compression chambers with said blower, said blower forcing ventilating gas to flow to both ends of said housing to said compression chambers, thence axially through said duct means and said rotor ducts and radially outward through said rotor radial ventilating passages to the air gap of the machine, thence through said other of said stator radial ventilating passages, thence through said cooler where ventilating gas from said blower mixes with the ventilating gas from said fans, and thence back to said fans and said blower.

7. A totally enclosed dynamoelectric machine comprising a stator having axially extending windings and radial ventilating passages, a rotatable shaft, a rotor mounted on said shaft, a gas tight housing enclosing said stator and said rotor, fans mounted on said shaft adjacent the ends of said rotor, longitudinal ducts in said housing about said stator connected with said stator radial ventilating passages, a cooler disposed between said housing and said stator, said fans drawing ventilating gas from said cooler to supply ventilating gas to both ends of said stator and forcing said ventilating gas to circulate in a path over the end turns of said stator windings, thence into said longitudinal ducts, thence radially inward through some of said stator radial ventilating passages to the air gap of said machine and thence radially outward through others of said stator radial ventilating passages, thence circumferentially of said stator through said cooler and back to said fans for recirculation through said machine; a blower mounted on said shaft at one end of said housing with ventilating gas admitted to said blower from the side adjacent said one of said fans, a baffle mounted between said blower and said one said fan so that said blower and said one said fan both draw ventilating gas directly from said cooler and cause said ventilating gas to flow axially in opposite directions through said blower and said one said fan, a gas compression chamber at each end of said housing, said rotor having axial ventilating ducts and radial ventilating passages, duct means connecting said rotor ducts with said compression chambers, and means comprising a channel connecting both said compression chambers with said blower, said blower forcing ventilating gas to flow to both ends of said housing to said compression chambers, thence axially through said duct means and said rotor ducts and radially outward through said rotor radial ventilating passages to the air gap of the machine, thence through said other of said stator radial ventilating passages, thence through said cooler where the ventilating gas from said blower mixes with the ventilating gas from said fans, and thence back to said fans and said blower.

8. A gas cooled dynamoelectric machine comprising a stator having radial ventilating passages, a rotatable shaft, a rotor mounted on said shaft, a gas tight housing enclosing said stator and said rotor, a cooler comprising an end portion and a main portion mounted between said housing and said stator, said rotor having axial ducts and radial ventilating passages, a centrifugal blower mounted on said shaft at one end of said machine, a first compression chamber at one end of said machine, a second compression chamber at the other end of said machine, a channel extending longitudinally of said machine and connected to said first and said second pressure chambers, a duct associated with said blower and extending into said channel through said end portion of said cooler for precooling said compressed gas, and means connecting said pressure chambers with said axial ducts in said rotor; said blower drawing gas from said main portion of said cooler and forcing said gas under relatively high pressure to flow through said duct and said end portion of said cooler, thence through said channel to said compression chambers, thence into said rotor ducts at both ends of said rotor, axially through said rotor ducts and radially through said rotor and stator ventilating passages, thence through said main portion of said cooler and back to said blower.

9. A hydrogen cooled dynamoelectric machine comprising a core provided with a slot, axially extending conductors lying in a stack of superposed layers inserted over part of their length in said slot, each said conductor comprising a pair of superposed straps having mutually abutting surfaces, each said strap having a plurality of longitudinal grooves in said abutting surface thereof, said longitudinal grooves in the straps of each said conductor cooperating together to define a plurality of longitudinal ducts in each said conductor, transverse ducts in end turn portions of said conductors extending beyond the ends of said core connect said longitudinal ducts with the outside surfaces of said stack, a plurality of radial ventilating openings extending through said stack, said radial ventilating openings being spaced intermediate the ends of the slot portions of said stack, a slot closing wedge for said slot, said wedge having longitudinally spaced radial ventilating openings in substantial radial alignment with said radial ventilating openings in said conductors, said radial ventilating openings in said wedge and in said stack communicating with said longitudinal ducts in said conductors, and means directing hydrogen under high pressure into said transverse ducts, through said longitudinal duct in said stack, thence out through said radial openings in said stack and said wedge.

10. A hydrogen cooled dynamoelectric machine comprising a core provided with a slot, axially extending conductors lying in a stack of superposed layers inserted over part of their length in said slot, each said conductor comprising a pair of superposed straps having mutually abutting surfaces, each said strap having a plurality of longitudinal grooves in said abutting surface thereof, said longitudinal grooves in the straps of each said conductor cooperating together to define a plurality of longitudinal ducts in each said conductor, transverse grooves in the straps of each said conductor cooperating together to define a plurality of transverse ducts, said transverse ducts disposed in the end turn portions of said conductors extending beyond the ends of said core connect said longitudinal ducts with the outside surface of said stack, a plurality of radial ventilating openings extending through said stack of conductors, said radial ventilating openings spaced intermediate the ends of the slot portions of said stack, a slot closing wedge for said slot, said wedge having longitudinally spaced radial ventilating openings therethrough in substantial radial alignment with said radial ventilating openings in said stack, and means directing hydrogen under high pressure into said transverse ducts, thence through said longitudinal ducts and out through said radial ventilating openings in said stack and said wedge, said means including a two stage centrifugal blower compressing said hydrogen to a pressure of at least eight inches of water to cause said hydrogen to flow through said core at the rate of at least twenty-five cubic feet per minute per kilowatt of heat removed by said hydrogen.

11. A hydrogen cooled dynamoelectric machine comprising a stator, a rotatable shaft, a rotor mounted on said shaft comprising a core provided with a slot having axially extending conductors lying in a stack of superposed layers inserted over part of their length in said slot, each said conductor comprising a pair of superposed straps having mutually abutting surfaces, a plurality of longitudinal grooves in said abutting surface of each said strap, said longitudinal grooves in the straps of each said conductor cooperating together to define a plurality of longitudinal ducts in each said conductor, transverse ducts in the end turn portions of said conductors connect said longitudinal ducts with the outside surface of said stack, a plurality of longitudinally spaced radial ventilating openings extending through the slot portion of each said stack intermediate the ends of the core communicating with said longitudinal ducts, a retaining ring surrounding said end turn portions of said conductors, an end plate mounted on said shaft, said end plate, said retaining ring, said shaft and said core defining an enclosed space therebetween containing said end turn portions of said conductors, a fan mounted on said shaft adjacent said rotor end plate for circulating gas over the end turns of said stator windings, a blower mounted on said shaft, a duct in said shaft between said compressor and said space, said blower compressing said gas to a pressure substantially five times said fan discharge pressure to cause said gas to flow through said shaft duct to said enclosed space where said gas enters said transverse ducts in said conductors, thence flows through said longitudinal ducts therein and escapes therefrom through said radial openings.

12. A hydrogen cooled dynamoelectric machine comprising a stator having radial ventilating passages and axially extending windings, a rotatable shaft, a rotor mounted on said shaft, said rotor comprising a core provided with a slot having axially extending conductors lying in a stack of superposed layers inserted over part of their length in said slot, each said conductor comprising a pair of superposed straps having mutually abutting surfaces, each said strap having a plurality of longitudinal grooves and a plurality of transverse grooves in said abutting surface thereof, said longitudinal grooves in the straps of each said conductor cooperating together to define a plurality of longitudinal ducts in each said conductor, said transverse grooves in said straps of each said conductor cooperating together to define a plurality of transverse ducts, said transverse ducts in the end turn portions of said conductors extending beyond the ends of said core connect said longitudinal ducts with the outside surface of said stack, a plurality of radial ventilating passages extending through said stack, said radial ventilating passages spaced intermediate the ends of the slot portions of said stack, a slot closing wedge for each slot, said wedge having longitudinally spaced radial ventilating passages therethrough in substantial radial alignment with said radial ventilating passages in said stack, a retaining ring for said end turn portions of said conductor secured to said rotor core and said shaft to define therewith a space enclosing said end turn portions, a fan mounted on said shaft adjacent said end ring for forcing hydrogen over said stator end windings, a compressor mounted on said shaft adjacent said fan for providing a differential hydrogen pressure of at least two-tenths of an atmosphere to said rotor core at the rate of at least twenty-five cubic feet per minute per kilowatt of heat absorbed, means directing said hydrogen from said compressor to said enclosing space where said hydrogen enters said conductors through said transverse ducts, then flows through said conductors through said longitudinal ducts and radial ventilating passages in said rotor conductors, and thence through said radial ventilating passages in said stator, so that said hydrogen has a temperature rise of less than seventy-five degrees centigrade.

13. A totally enclosed gas cooled dynamoelectric machine comprising a cooler, a rotatable shaft, and a rotor mounted on said shaft, said rotor comprising a core provided with a slot having axially extending conductors constructed and arranged in said slot to provide axial ventilating ducts through said core with ventilating gas in direct contact with said conductors, a high pressure blower mounted on said shaft at one end of said machine, said shaft driving said blower at the necessary speed for compressing said gas to a relatively high pressure of at least eighty inches of water multiplied by the ratio of the density of the gas at one atmosphere to the density of air at one atmosphere and multiplied by the number of atmospheres pressure of a said gas in said machine to force said ventilating gas in a path including said cooler and said ventilating duct of said core.

14. A totally enclosed dynamoelectric machine comprising a housing containing a ventilating gas at a pressure of substantially one atmosphere, a cooler, a rotatable shaft, a rotor mounted on said shaft, said rotor comprising a core provided with a slot having axially extending conductors constructed and arranged in said slot to provide axial ventilating ducts through said core with said ventilating gas in direct contact with said conductors, a high pressure blower mounted on said shaft at one end of said machine, said shaft driving said blower at the necessary speed for compressing said gas to a relatively high pressure of at least eighty inches of water when air is the ventilating gas to force said ventilating gas in a path including said cooler and said ventilating ducts of said core, said blower causing said ventilating gas to flow through said ducts at relatively high velocity and at a volume above the threshold rate of twenty-five cubic feet per minute per kilowatt of heat absorbed.

15. In a totally enclosed gas cooled dynamoelectric machine of the turbogenerator type having a shaft mounted blower for circulating gas in said machine, the method of cooling axially extending conductors inserted in slots of a core of said machine, said method comprising the steps of providing longitudinal ventilating ducts in the core slots to bring the gas into substantially direct contact with the slot portions of the conductors, and having said blower supply the gas between supply and discharge points of the ducts at a differential pressure of at least eighty inches of water multiplied by the ratio of the density of the gas in the machine to the density of air at atmospheric pressure to cause the gas to flow through the ducts at a rate of at least twenty-five cubic feet per minute per kilowatt of heat absorbed.

16. A dynamoelectric machine having a rotor and a stator, said stator having a magnetic core having slots, said slots containing casings of insulating material having a rating of at least 10,000 volts which enclose slot lying winding conductors which have smaller total cross section than the space internal to said casings thereby providing spaces for ducts within said casings, and means causing hydrogen to flow through said ducts in substantially greater weight per second than would result if hydrogen at atmospheric pressure were subjected to a pressure gradient of 0.24 pound per square inch between the ends of the duct, the winding conductors having end winding portions extending both axially and circumferentially at the ends of the slot lying portions, and having intervening bends between said end winding portions and said slot lying portions; said slot lying portions, said end winding portions, and the intervening bends of the respective winding conductors having one or more of said ducts located contiguous to, and in intimate thermal heat exchange relation with, the respective winding conductors.

17. A dynamoelectric machine having a rotor and a stator at least one of which has a winding operating at at least 10,000 volts and comprising a core having axially extending conductor receiving slots therein, said winding having conducting portions disposed in said conductor receiving slots, slot insulation also disposed in each conductor receiving slot, each conductor receiving slot being sufficiently larger than the space requirements of the conducting portion or portions and the slot insulation disposed therein so as to provide a slot duct system including an axially extending cooling duct or ducts in such manner that at least a part of each slot duct system is bounded by a portion or portions of the conducting portions disposed in that slot, an enclosing housing providing a gas tight chamber within which said core and its winding are located, a filling of a gas having heat scavenging properties substantially equivalent to those of hydrogen in said chamber at a pressure of at least one atmosphere, means for providing a recirculating path for said gaseous filling flowing axially within said cooling ducts, heat exchanging means included in said recirculating path for cooling said gaseous filling, and means for driving said gas through said duct system with a pressure head between duct termini equal to at least $$\frac{V^2}{2g}$$

where $V$ is the linear velocity at the periphery of said rotor and $g$ is the acceleration constant for gravity.

18. A dynamoelectric machine having a rotor and a stator at least one of which has a magnetic core having slots, said slots containing casings of insulating material having a rating of at least 10,000 volts which enclose conductors which have smaller total cross section than the space internal to said casing thereby providing spaces for ducts within said casings, and a multistage fan having blades carried by said rotor in alignment with the periphery thereof for causing a gas having heat scavenging properties substantially equivalent to those of hydrogen at a pressure of at least one atmosphere to flow through said ducts under a pressure head of substantially more than 3500 feet.

19. A dynamoelectric machine having stator and rotor members, and an enclosing housing, said stator or rotor comprising a core having axially extending conductor receiving slots therein, a winding having a rating of at least 10,000 volts having conducting portions disposed in said conductor receiving slots, slot insulation also disposed in each conductor receiving slot, each conductor receiving slot being sufficiently larger than the space requirements of the conducting portion or portions and the slot insulation disposed therein so as to provide a slot duct system including an axially extending cooling duct or ducts in good heat exchanging relation with the conductors of said winding, said enclosing housing providing a gas tight chamber within which said core and its winding are located, a filling of hydrogen in said chamber at a pressure of at least one atmosphere, means for providing a recirculating path for said hydrogen flowing axially within said cooling ducts, heat exchanging means included in said recirculating path for cooling said gaseous filling, and a fan with blades aligned with the periphery of said rotor having more than one stage for driving said hydrogen through said cooling ducts.

20. A totally enclosed gas cooled dynamoelectric machine comprising a stator having a laminated core provided with axially extending slots containing windings, a rotatable shaft, a rotor mounted on said shaft, said rotor including a core provided with axially extending slots containing windings, said stator core and said rotor core defining an air gap therebetween, said stator windings and said rotor windings comprising conductors constructed and arranged in said core slots to provide axial ducts therethrough, a cooler, blower means mounted on said shaft, said blower means producing a differential gas pressure of at least eight inches of water when hydrogen is the ventilating gas and is contained in the machine at an absolute pressure of one atmosphere, said blower causing said ventilating gas to flow in parallel paths through said axial ventilating ducts in said stator and said rotor and through said air gap from one end of said machine to the other end of said machine and in a path through said cooler.

21. A totally enclosed gas cooled dynamoelectric machine comprising a stator having a laminated core provided with slots and axially extending conductors, a rotatable shaft, a rotor mounted on said shaft, said rotor including a slotted core provided with axially extending windings, said rotor windings comprising conductors constructed and arranged in the slots of said core to provide axial ventilating ducts therethrough, a cooler mounted on said machine, a high pressure blower mounted on said shaft at one end of said machine to compress said gas to a differential pressure of at least eight inches of water when hydrogen at atmospheric pressure is the ventilating gas, means directing said gas from said blower to the other end of said machine through said cooler for cooling said compressed gas before said gas reaches said cores, said blower producing a relatively low pressure gas region at said end of said machine adjacent said blower to cause said cooled gas to flow through said axial ventilating ducts in said stator and said rotor from said other end of said machine to said low pressure region and back to said blower.

22. In a totally enclosed gas cooled dynamoelectric machine of the turbogenerator type having a blower for circulating gas in said machine, the method of cooling axially extending conductors inserted in slots of the rotor core and of the stator core, said method comprising the steps of providing longitudinal ventilating ducts in the slots of the cores to bring the gas into substantially direct contact with the slot portions of the conductors, and having said blower supply the gas between supply and discharge points of the ducts at a differential pressure of at least eight inches of water multiplied by the ratio of the density of the gas in the machine to the density of hydrogen at atmospheric pressure.

23. A totally enclosed gas cooled dynamoelectric machine comprising a stator having a laminated core provided with axially extending slots containing windings, a rotatable shaft, a rotor mounted on said shaft, said rotor including a core provided with axially extending slots containing windings, said stator core and said rotor core defining an air gap therebetween, said stator windings and said rotor windings comprising conductors constructed and arranged in said core slots to provide axial ducts therethrough bringing the gas into substantially direct contact with the slot portions of the stator and rotor conductors, a cooler, a blower, said blower compressing said gas to a relatively high pressure of at least eight inches of water multiplied by the ratio of the density of the gas in the machine to the density of hydrogen at atmospheric pressure to cause said gas to flow in a path through said cooler and said ventilating ducts of both said cores at a rate of at least twenty-five cubic feet per minute per kilowatt of heat absorbed.

References Cited in the file of this patent

UNITED STATES PATENTS

| | | |
|---|---|---|
| 1,170,192 | Rudenberg | Feb. 1, 1916 |
| 2,221,567 | Baudry | Nov. 12, 1940 |
| 2,451,219 | Holmgren | Oct. 12, 1948 |
| 2,573,670 | Moses | Oct. 30, 1951 |

FOREIGN PATENTS

| | | |
|---|---|---|
| 380,067 | Great Britain | Sept. 7, 1932 |
| 603,961 | Germany | Oct. 11, 1934 |
| 714,319 | France | Sept. 1, 1931 |

OTHER REFERENCES

A.I.E.E. Transactions for 1950, pp. 191 to 194, published by the American Institute of Electrical Engineers.